US011853798B2

(12) United States Patent
Tavallaei et al.

(10) Patent No.: US 11,853,798 B2
(45) Date of Patent: Dec. 26, 2023

(54) DISAGGREGATED MEMORY POOL ASSIGNMENT

(71) Applicant: Microsoft Technology Licensing, LLC, Redmond, WA (US)

(72) Inventors: Siamak Tavallaei, Spring, TX (US); Vishal Soni, Redmond, WA (US); Ishwar Agarwal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 266 days.

(21) Appl. No.: 17/011,805

(22) Filed: Sep. 3, 2020

(65) Prior Publication Data

US 2022/0066827 A1 Mar. 3, 2022

(51) Int. Cl.
*G06F 9/46* (2006.01)
*G06F 9/50* (2006.01)
(Continued)

(52) U.S. Cl.
CPC ........ *G06F 9/5016* (2013.01); *G06F 9/30101* (2013.01); *G06F 9/4411* (2013.01);
(Continued)

(58) Field of Classification Search
CPC .. G06F 9/5016; G06F 9/30101; G06F 9/4411; G06F 9/467; G06F 9/5083;
(Continued)

(56) References Cited

U.S. PATENT DOCUMENTS 6,326,973 B1 12/2001 Behrbaum et al.
9,250,831 B1 * 2/2016 Saxena ................ G06F 3/0659
(Continued)

FOREIGN PATENT DOCUMENTS

GB 2490033 A * 10/2012 ......... G06F 9/30098
WO 2018004927 A1 1/2018

OTHER PUBLICATIONS

"International Search Report and Written Opinion Issued in PCT Application No. PCT/US21/031001", dated Aug. 26, 2021, 14 Pages.
(Continued)

*Primary Examiner* — Bradley A Teets
(74) *Attorney, Agent, or Firm* — Alleman Hall Creasman & Tuttle LLP (57) ABSTRACT

Examples are disclosed that relate to a disaggregated memory pool. One example provides a memory system comprising a memory controller and memory attached to the memory controller and forming at least a portion of a disaggregated memory pool, the disaggregated memory pool including a plurality of slices that are each dynamically assigned to a respective compute node. The memory system is configured to receive a request to adjust an assignment of the memory pool to a requesting compute node, where the portion of the memory pool includes an unassigned slice that can satisfy the request, assign at least part of the unassigned portion to the requesting compute node, and where the portion of the memory pool does not include an unassigned slice that can satisfy the request, cause a request to be directed to another compute node to free at least one slice to the such compute node.

17 Claims, 7 Drawing Sheets

(51) Int. Cl.
G06F 9/30 (2018.01)
G06F 9/4401 (2018.01)
G06F 12/02 (2006.01)

(52) U.S. Cl.
CPC ............ G06F 9/467 (2013.01); G06F 9/5083 (2013.01); G06F 12/0238 (2013.01); *G06F 2209/508* (2013.01); *G06F 2209/5011* (2013.01); *G06F 2209/5022* (2013.01)

(58) Field of Classification Search
CPC ......... G06F 12/0238; G06F 2209/5011; G06F 2209/5022; G06F 2209/508
USPC ....................................................... 718/104
See application file for complete search history.

(56) References Cited

U.S. PATENT DOCUMENTS

| | | | |
|---|---|---|---|
| 9,262,225 | B2 | 2/2016 | Davis et al. |
| 9,535,606 | B2 | 1/2017 | Krithivas et al. |
| 10,476,670 | B2 | 11/2019 | Schmisseur et al. |
| 10,936,374 | B2* | 3/2021 | Bivens .................. G06F 9/5016 |
| 2012/0030406 | A1 | 2/2012 | Chang et al. |
| 2012/0263191 | A1* | 10/2012 | Baron ................. H04L 67/1097 370/462 |
| 2013/0346718 | A1* | 12/2013 | Meshchaninov ... G06F 12/1036 711/164 |
| 2015/0186069 | A1 | 7/2015 | Sharma et al. |
| 2017/0153942 | A1* | 6/2017 | Cabral ................ G06F 11/1402 |
| 2018/0027062 | A1* | 1/2018 | Bernat ............... H04Q 11/0003 709/224 |
| 2018/0253244 | A1 | 9/2018 | Li et al. |
| 2019/0050261 | A1* | 2/2019 | Schmisseur ........... G06F 9/4881 |
| 2019/0320021 | A1 | 10/2019 | Nachimuthu et al. |
| 2020/0174843 | A1* | 6/2020 | Ruan .................... G06F 9/5072 |
| 2020/0394041 | A1* | 12/2020 | Lueh ....................... G06F 9/544 |
| 2022/0066928 | A1* | 3/2022 | Tavallaei ............... G06F 9/5077 |

OTHER PUBLICATIONS

Application as Filed in U.S. Appl. No. 16/529,672, filed Aug. 1, 2019, 51 Pages.
Ruggles, Gary, "Introduction to the Compute Express Link Standard", Retrieved from: https://web.archive.org/web/20191130015826/ https:/www.synopsys.com/designware-ip/technical-bulletin/compute-express-link-standard-2019q3.html, Nov. 30, 2019, 11 Pages.

* cited by examiner

DISAGGREGATED MEMORY POOL ASSIGNMENT

BACKGROUND

Data centers typically include large numbers of discrete compute nodes, such as server computers or other suitable computing devices. Such devices may work independently and/or cooperatively to fulfill various computational workloads.

DETAILED DESCRIPTION

As discussed above, data centers typically include large numbers of discrete compute nodes, such as server computers or other suitable computing devices. Such compute nodes may be referred to as "host computing devices," or "hosts," as they may in some cases be used to host virtual machines. It will be understood, however, that a compute node may be used for any suitable computing purpose, and need not be used for hosting virtual machines specifically. Furthermore, in some examples, a compute node may be implemented as a virtual machine.

Depending on the specific implementation, each individual compute node may have any suitable collection of computer hardware. For instance, traditional servers may each be substantially self-sufficient, including processing resources, data storage, volatile/non-volatile memory, network interface componentry, a power supply, a cooling solution, etc. By contrast, some "blade servers" or racked systems omit internal power supplies, cooling systems, and/or network interfaces, instead relying on a enclosure/rack structure to provide such infrastructure-type functionality for a compute node cluster.

Regardless, each individual compute node will typically include some local/native collection of hardware resources, including data storage, memory, processing resources, etc. However, computational workloads (e.g., associated with data center customers) are often not uniformly distributed among the compute nodes in the data center. Rather, in a common scenario, a subset of compute nodes in the data center may be tasked with resource-intensive workloads, while other nodes sit idle or handle relatively less resource-intensive tasks. Thus, the total resource utilization of the data center may be relatively low, and yet completion of other intensive workloads may be resource-constrained due to how such workloads are localized to individual nodes having finite resources. In other cases, compute nodes simply are provisioned with memory and/or other resources that substantially exceed what is needed for statistically normal operation. These scenarios represent an inefficient use of the available compute resources, sometimes known as "resource stranding," as native resources that could potentially be applied to non-local workloads are instead stranded in idle or underutilized hosts.

This problem can be mitigated when hardware resources are pulled out of individual compute nodes and are instead disaggregated as separate resource pools that can be flexibly accessed by multiple connected compute nodes. For example, volatile memory hardware (e.g., random-access memory (RAM)) may be collected as part of a disaggregated memory pool that may be utilized by any of a plurality of compute nodes—e.g., in a data center. This serves to alleviate resource stranding, as compute nodes are free to request memory when needed, and release such memory when no longer needed.

In some examples, the amount of memory collectively allocated to a plurality of compute nodes may exceed the amount of memory actually provisioned in a disaggregated memory pool. This is sometimes referred to as "thin provisioning." In general, in data center environments without thin provisioning, it can be observed that individual compute nodes (and/or virtual machines implemented on the compute nodes) are often provisioned with more resources (e.g., storage space, memory) than the compute nodes end up actually using, statistically over time. For instance, the amount of memory installed for a particular compute node may be significantly higher than the amount of memory actually utilized by the compute node in most situations. When compounded over a plurality of compute nodes, the average amount of idle memory (or other resources) can represent a significant fraction of the total memory in the data center.

In one example scenario without thin provisioning, a disaggregated memory pool may include 1 TB (1024 GB) of total memory, which may be distributed evenly between eight compute nodes. Furthermore, each compute node may include 128 GB of natively-attached memory. Thus, each compute node may be assigned 128 GB of memory of the disaggregated memory pool, while having a total of 256 GB of provisioned memory between the natively-attached memory and pooled memory. In aggregate, the eight compute nodes may have access to 2 TB of memory total, again between the natively-attached memory and pooled memory. In this example, as a result of the 128 GB of native memory and 128 GB of pooled memory, each node is allocated 256 GB of memory from the perspective of an operating system (OS) executing on the node and the memory system. That is, 256 GB of available memory is "visible" to the node.

However, it is generally unlikely that each compute node will fully utilize its memory allocation, particularly since the system is not thin provisioned. Rather, in a more common scenario, each compute node may only use 50% of its allocated memory during normal usage, and some compute nodes may use significantly less than 50%. As such, even though the 1 TB disaggregated memory pool will be fully assigned to the plurality of compute nodes, only a relatively small fraction of the pooled memory may be in use at any given time. This represents an inefficient use of the available resources.

Given this, the amount of memory actually available—i.e., "provisioned" in the memory pool could be reduced without significantly affecting performance of the plurality of compute nodes. For instance, the memory space of each compute node could still be constructed so that the pool portion of its memory allocation was 128 GB (thus amounting to 1 TB when summing the eight nodes), for example by providing an address range for 128 GB remote memory; however, the memory pool could be actually provisioned with only a total of 256 GB. Thus, the amount of allocated memory exceeds the amount of memory that is actually provisioned, yet an OS and application executing on a compute node will perceive and be able to use 256 GB, including 128 GB of local memory natively-attached to the compute node and, as needed, 128 GB of remote memory from the memory pool.

In this example, while each particular compute node is allocated 128 GB of pool memory, it is statistically likely that many compute nodes will not use all, or even a significant portion, of that 128 GB at any given time. Thus, any unused memory assigned to one compute node may be reassigned to one or more of the other nodes. In this manner, any particular compute node has the option to use up to 128 GB of pool memory if needed, while still conserving memory in the disaggregated pool, due to the fact that each compute node typically will not use 128 GB at any given time. "Allocation" as used herein thus may refer to an amount or region of memory made visible to and accessible by a compute node and software executed thereon, where the overall allocation may come from local, natively-attached and remote, pooled memory. As noted above, an amount of memory allocated from a memory pool to each of a plurality of compute nodes may be greater than the physical memory in the memory pool that could be provided to each compute node were the memory pool evenly distributed the compute nodes.

Thin provisioning represents one potential impetus for adjusting how a disaggregated memory pool is assigned to compute nodes. Adjustments to the assignments of a memory pool may be desired in other contexts including those in which thin provisioning is not employed—for example, the provision of additional memory may be required for a compute node to complete a workload that demands a greater amount of memory than that currently allocated to the node, even where the allocated amount equals the amount actually usable by the node.

One approach to increasing memory allocation to a compute node simply involves attaching additional physical memory to the node. A paradigm that enables the addition of physical memory to a compute node during node operation is referred to as "hotplug", in which the physical addition of memory during node operation is referred to as "hot-adding" memory, and the physical removal of memory during node operation is referred to as "hot-removing" memory. These operations may involve the physical insertion/removal of a dual in-line memory module (DIMM) in/from a motherboard, as one example. Hotplug also supports mechanisms for logically "onlining" memory—i.e., making memory available/usable by a node after installation of the memory—and "offlining" memory—i.e., making installed memory unavailable/unusable by a node.

Hotplug-based approaches to memory management pose various drawbacks, however. For example, hotplug protocols supported by the Advanced Configuration and Power Interface (ACPI) standard are based on assigning a physical memory device to a node, which stipulates that an entire memory device (e.g., a memory expansion board)—and thus the entirety of the memory provided by that memory device—be attached to a single host. As such, while the entirety of the memory provided by the memory device can be flexibly assigned to different nodes through onlining/offlining, the assignment of smaller, more granular amounts of memory is precluded. Depending on the memory provided by the memory device, large amounts of memory (e.g., tens of GB) in their entirety may be assigned to a host. The assignment of larger amounts of memory increases memory fragmentation and significantly limits the ability to share pooled memory among multiple nodes.

The hotplug paradigm may pose additional drawbacks. For example, existing mechanisms for detecting the hot-addition/-removal of memory are based on custom hardware circuitry. This requires custom firmware to interface with ACPI. As such, an OS is required to interact with on-system firmware during hot-add/-remove procedures. Reliability and servicing issues may result in implementations where the firmware is opaque. Additionally, hotplug implementations may also require custom hardware, firmware, and drivers to support different central processing unit (CPU) architectures, increasing cost and complexity. Taken together, existing hotplug-based techniques are prohibitive for dynamic portioning, management, and sharing of memory across nodes.

Some approaches enable a physical memory device to be partitioned into logical devices. For example, mechanisms based on the Peripheral Component Interconnect Express (PCIe) plug-and-play framework allow the partitioning of a physical memory device into logical devices, but require additional hardware such as compute express link (CXL) switch(es) to present logical devices as physical devices. Introducing switch(es) in a CXL hierarchy also adds latency to memory accesses. Further, PCI plug-and-play requires re-enumeration of a PCIe bus and the loading of drivers for newly added memory devices. This results in indeterministic latencies for hot-adding/-removing memory. In other words, these approaches are suboptimal from a memory latency perspective.

Accordingly, examples are disclosed that relate to providing a disaggregated memory pool including a plurality of memory slices that are dynamically assigned to compute nodes. As part of an initialization process, a compute node discovers one or more memory controllers each attached to memory that is remote from the perspective of the compute node. The memory attached to each memory controller collectively forms the memory that comprises the disaggregated memory pool, whose extent (e.g., address range) and topology is also discovered during initialization of the compute node. While this environment information is known at and exposed to the node, use of the memory pool by the compute node is initially disabled. Instead, the compute node queries memory controllers to discover the slices of the memory pool that are assigned to that compute node. Typically, the number of slices in the pooled memory ecosystem dramatically exceeds the number of slices that can potentially be use by the node. For example, a pool system might include many terabytes of memory slices, with an individual node perhaps having access to only 512 GB of memory.

A request-based framework allows compute nodes to request the assignment of additional slices and free previously-assigned slices. In some examples, requests for additional slices or slice expansion may be serviced using an unassigned slice of the memory pool. In other examples, such requests may be serviced by asking compute nodes to free assigned slices, where the compute nodes may evaluate the usage of slices to determine whether slices can be freed.

The approaches described herein provide a disaggregated memory pool that can be distributed—by way of slices—among any suitable number of compute nodes with any suitable level of granularity. This may increase utilization of the memory pool and reduce resource stranding, which in turn may enable the provision of a memory pool of reduced size that fulfills the computational requirements of the compute nodes. As such, the described approaches may support and enhance thin provisioning, but also apply to examples in which thin provisioning is not used. Further, the described approaches may provide these and other advantages without stipulating device re-enumeration and the inclusion of switches, thereby reducing latency in memory transactions and latency indeterminacy. In addition, mechanisms are provided to protect slice assignments to respective compute nodes, such that a compute node is prevented from accessing a slice not assigned to that node.

Figure 1:
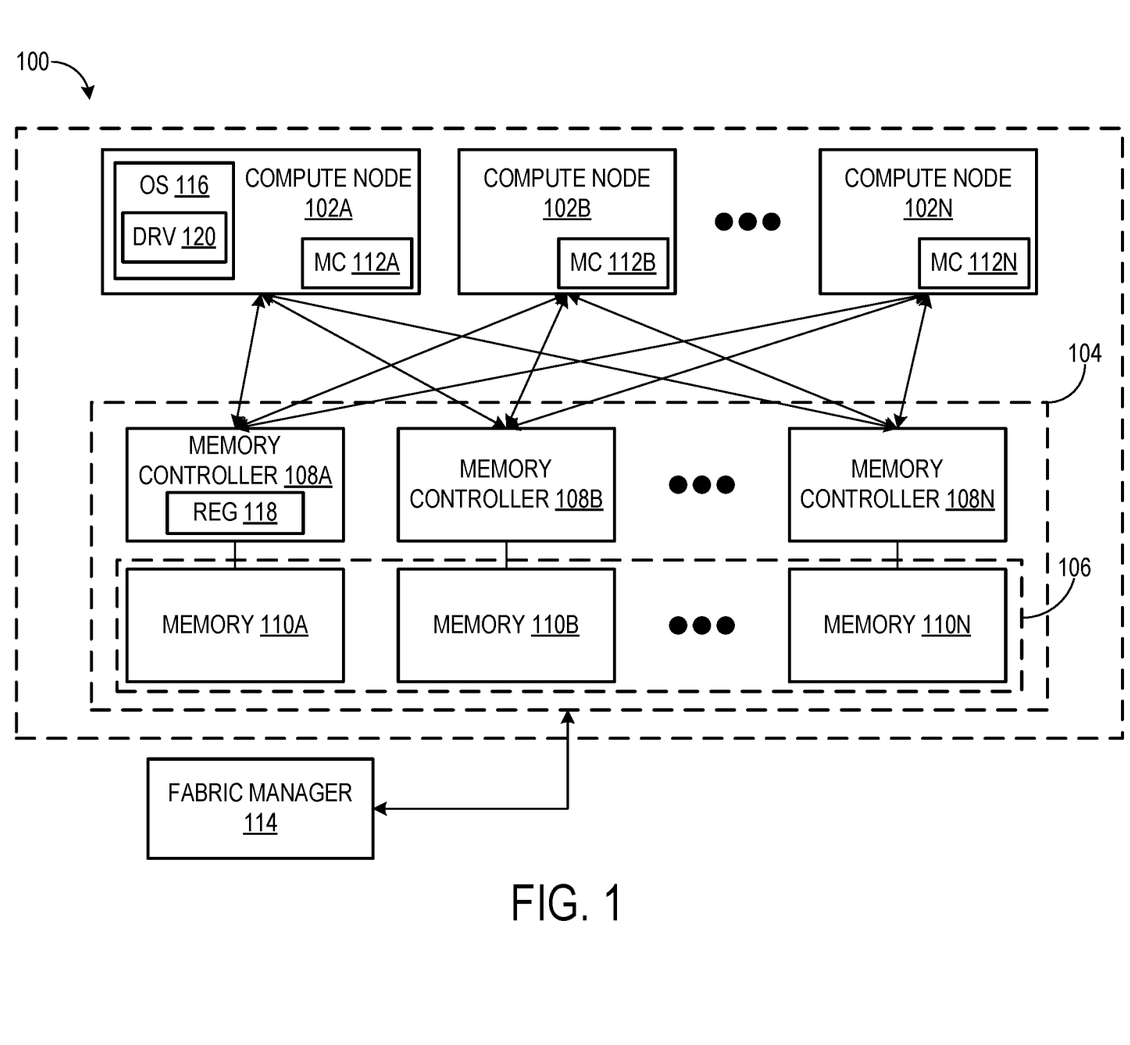
FIG. 1 schematically depicts a plurality of compute nodes communicatively coupled with a disaggregated memory pool.

FIG. 1 schematically shows an example computing system 100 in which a plurality of compute nodes 102A-N is communicatively coupled to a memory system 104 that includes a disaggregated memory pool 106. N is any suitable positive integer, such that any suitable number of compute nodes 100 may utilize memory pool 106 in executing computational workloads.

Memory system 104 includes a plurality of memory controllers 108A-N, where N is any suitable positive integer. Attached to each memory controller 108 is a respective set of memory 110, such as memory 110A, which is attached to memory controller 108A. Collectively, the memory 110A-N attached to each memory controller 108 forms the memory that comprises disaggregated memory pool 106. As described below, each memory controller 108 manages requests to assign portions of its attached memory 110 to compute nodes 102, manages requests to free assigned portions of attached memory, and may enforce per-node assignments. In some examples, memory controllers 108 may be accessible by each compute node 102 with relative uniformity, while in other examples different memory controllers may be provided to different compute nodes with different qualities of service.

Collectively, memory controllers 108 cooperate with other components in system 100 to assign slices of memory pool 106 to corresponding compute nodes. As used herein, a "slice" of memory pool 106 refers to at least a portion of the memory 110 comprising the memory pool. Memory 110 may assume any suitable form, including but not limited to that of Double Data Rate Synchronous Dynamic RAM (DDR SDRAM).

The memory 110 forming disaggregated memory pool 106 is remotely attached to compute nodes 100. As such, memory 110 and memory pool 106 may be referred to as "extended", "remote", or "pooled" memory. As memory controllers 108 manage such pooled memory, the memory controllers similarly may be referred to as extended", "remote", or "pooled" memory controllers. In contrast, each compute node 102 interfaces with a respective native memory controller 112 (e.g., native memory controller 112A, which interfaces with compute node 102A). Each native memory controller 112 controller manages local memory natively-attached to the corresponding compute node 100.

As such, native memory controllers 112 may facilitate the execution of memory transactions, directed to natively-attached memory, in natively-attached memory. Native memory controllers 112 may perform other functions including but not limited to preferentially directing memory transactions to natively-attached memory, and executing functions responsive to communications from memory controllers 108. For example, a native memory controller 112 may receive an indication from a memory controller 108 that the portion of memory pool 106 available for assignment to compute nodes 102 is low, and in response delay a request to assign a portion of the memory pool to a compute node.

In some examples, each native memory controller 112 may include a component that processes memory transactions to determine whether those transactions should be directed to natively-attached memory or disaggregated memory pool 106, and directs memory transactions to the appropriate location. For example, the component may utilize an address map that identifies address ranges corresponding to natively-attached memory and address ranges corresponding to memory pool 106. This component may also handle communications from memory controllers 108. In contrast, OSes executing on compute nodes 102 that cause such memory transactions to be issued may lack awareness of the delineation between natively-attached and pooled memory. Instead, both sets of memory may appear to the OSes as a contiguous address range. Thus, native memory controllers 112 may direct memory transactions to memory pool 106 in a manner that is transparent to compute nodes 102 and software executing thereon. However, in some examples described below, OSes executing on compute nodes 102 may be configured with a class driver and application programming interface (API) that interface with memory controllers 108 to enable the OSes to utilize disaggregated memory pool 106.

Each memory controller 108 may include one or more ports that each communicatively couple the memory controller to one or more compute nodes 102. Where native memory controllers 112 are configured with an awareness of memory controllers 108 as described above, the port(s) of memory controllers 108 may be communicatively coupled to the native memory controllers. In the depicted example, memory controllers 108 are directly attached to compute nodes 102 without an intermediate switch. However, implementations are contemplated in which a switch is used to communicatively couple memory controllers 108 to compute nodes 102. Where a switch is used, each memory controller 108 may include a single port to communicate with the switch and multiple compute nodes 102. Further, in some examples, each memory controller 108 may be a CXL-compliant memory controller (e.g., a type 3 CXL device that supports CXL.io and CXL.mem protocols). In such examples, and where memory controllers 108 are directly attached to compute nodes 102 without a CXL switch, each memory controller may present itself to compute nodes 102 as multiple single-logical devices on multiple CXL links. In examples where memory controllers 108 are CXL-compliant memory controllers but a switch is used to facilitate memory controller-node communication, each memory controller may present itself to compute nodes 102 as a multi-logical memory device on CXL link(s).

Computing system 100 also includes a fabric manager 114 that cooperates with compute nodes 102 and memory controllers 108 to service requests regarding slices of disaggregated memory pool 106. The fabric manager in essence has a global view of the larger memory pool 106 (as opposed to having visibility into only slices managed by a single pooled memory controller 108) and provides coordinated global functionality. To this end, fabric manager 114 may receive, from each memory controller 108, a description of the slice(s) of the memory 110 attached to that memory controller. Fabric manger 114 may then assemble the descriptions from each memory controller 108 in a manifest that collectively describes the slice(s) of the overall disaggregated memory pool 106.

Figure 2:
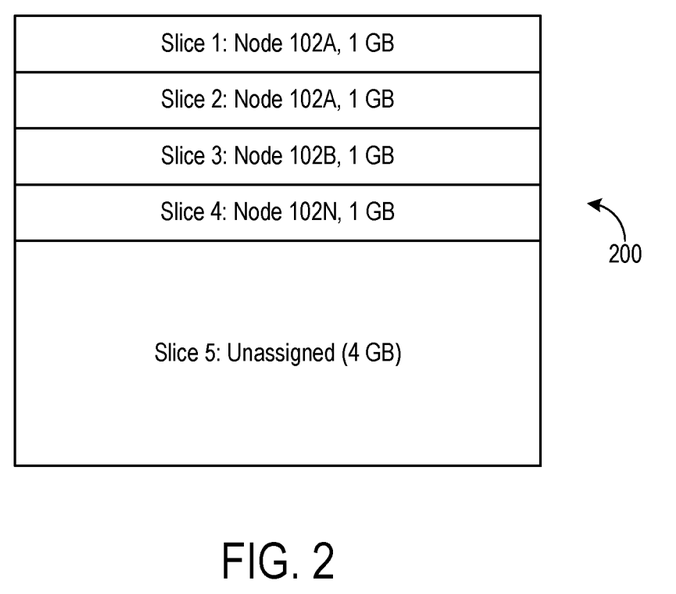
FIG. 2 depicts an example manifest of slices of a disaggregated memory pool.

FIG. 2 depicts an example manifest 200 of the slices into which memory pool 106 is divided for an example scenario in which a portion of the memory pool is assigned to various compute nodes 102, and another portion of the memory pool is not assigned to any compute node. Manifest 200 includes a description of each slice of memory pool 106, indicating the compute node 102 to which that slice is assigned (for slices that are assigned to a compute node) and a size of the slice. Manifest 200 may include any suitable additional or alternative information, however, including but not limited to an address range of each slice. Further, in some examples fabric manager 114 may provide manifests to a higher-level manager, allocator, and/or hypervisor that participates in assigning slices of memory pool 106.

In addition to maintaining a manifest of how the slices of disaggregated memory pool 106 are assigned, fabric manager 114 may direct assignments of the memory pool. For example, fabric manager 114 may receive a request to assign a slice to a compute node 102 and consult its manifest to identify a slice in memory pool 106 that satisfies the request. Where an unassigned slice—that is, a slice not assigned to any compute node 102—that can satisfy the request is identified, fabric manager 114 may request or instruct the corresponding memory controller 108 attached to the memory 110 containing the slice to assign at least a portion of the unassigned slice to the requesting node. In particular, a portion of the unassigned slice that satisfies the request may be assigned to the requesting compute node 102 (e.g., and not the entire unassigned slice, if its size is greater than the portion that satisfies the request).

If instead an unassigned slice is not available anywhere in memory pool 106, fabric manager 114 may issue a request to one or more memory controllers 108 to free slice(s) currently assigned to compute nodes 102. However, examples are possible in which this functionality is carried out at least in part at memory controllers 108. For example, a memory controller 108 may receive a request for a slice, and determine whether the memory 110 attached to that memory controller includes an unassigned portion that can satisfy the request. If such an unassigned portion exists, memory controller 108 may assign at least part of the portion as a slice to the requesting compute node 102. If such an unassigned portion does not exist, memory controller 108 may request a compute node 102 to free an assigned slice stored by the memory 110 attached to the memory controller.

In some examples, a portion of memory pool 106 may be maintained as a buffer so that future requests for slices can be serviced using the buffer where there is an insufficient unassigned portion (aside from the buffer) to service such requests and/or compute nodes 102 cannot free sufficient slices to service such requests despite being asked to do so. In examples where memory pool 106 includes such a buffer, a request for a slice may be rejected even where the size of the buffer is sufficient to service the request. This may be considered a scenario in which memory pool 106 does not include an unassigned slice that can satisfy a request for a slice. In such examples, rather than using the buffer to service the request, assigned slice(s) whose un-assignment is less likely to cause issues may be identified, for example based on slice usage information, and compute node(s) 102 assigned to those slice(s) may be asked to free the slice(s).

Slice usage information utilized by fabric manager 114 in directing the assignment of slices and un-assignment of slices may include per-slice usage information (e.g., how recently each slice was used, how often each slice is used, an identification of the application using each slice, a priority or importance of the data in each slice). Such information may be included in a manifest as described above or provided in any other suitable manner. For example, fabric manager 114 may utilize per-slice usage information to assign, to a requesting compute node 102, a slice from a particular unit of memory 110 that houses another slice assigned to that same compute node. As another example, fabric manager 114 may utilize per-slice usage information to preferentially identify candidate slices to be freed that are deemed lower priority and/or less frequently or recently used.

A memory controller 108 receiving a request to free an assigned slice may query an OS executing on the compute node 102 using the assigned slice. FIG. 1 illustrates an example approach in which memory controller 108A generates an interrupt (e.g., a message signaled interrupt (MSI), MSI-X, system management interrupt (SMI), or non-maskable interrupt (NMI)) to compute node 102A in an attempt to free slice(s) assigned to the compute node 102A and being used by an OS 116 executing on the compute node 102A. In this example, the request to free assigned slice(s) is stored in one or more registers 118 of memory controller 108A. A class driver 120 implemented by OS 116 reads register(s) 118 to discover the request, and invokes an API of the OS to request that assigned slice(s) be freed. Similarly, requests to assign free slices, and other requests regarding slice assignment, may also be stored in register(s) 118 for discovery by OS 116 via class driver 120.

OS 116 may determine whether slice(s) assigned to compute node 102A may be freed in any suitable manner. For example, OS 116 may accept a request to free a slice if the OS is currently not using, or expected to use in the future, the slice, and may reject the request if the OS is currently using the slice or is likely to do so in the future. OS 116 may consider alternative or additional criteria, including but not limited to policies that render the relinquishment of slices less likely for some applications/workloads than others, such as mission critical workloads or workloads whose completion is required to fulfill a service level agreement. As another example, OS 116 may designate the assignment of slice(s) to compute node 102A as being fixed, where such fixedly-assigned slice(s) cannot be reassigned to another compute node.

In some examples, the slice(s) freed by OS 116 are sufficient to fulfill a request for slice(s) by a compute node 102. In other examples, OS 116 may be unable to free slice(s) in sufficient number and/or size to fulfill the request. In this case, OS 116 may free as many slice(s) as can be freed and output an indication (from compute node 102A or memory controller 108A) to fabric manager 114 that other slice(s) are not freed. Fabric manager 114 then may request one or more other OSes executing on other compute nodes 102 to free the slice(s) that OS 116 was unable to free. In some examples, OS 116 may be unable to free any slices, in which case compute node 102A or memory controller 108A may output an indication to fabric manager 114 that the request to free slice(s) is rejected.

Requests to adjust the assignment of disaggregated memory pool 106, including requests to assign slice(s) and free assigned slice(s), may originate from any suitable location. For example, such requests may originate from a compute node 102 or an OS (e.g., OS 116) executing thereon. These requests may be relayed directly to one or more memory controllers 108, or to fabric manager 114, which may then direct the requests to selected memory controllers. As another example, fabric manager 114 may instruct one or more memory controllers 108 to adjust slice assignment(s)—e.g., based on a request or instruction to adjust slice assignment(s) from a higher-level allocator. Where fabric manager 114 is involved in slice assignment, the fabric manager may consult a manifest (e.g., manifest 200) to determine which memory controllers 108 and/or compute nodes 102 to request to adjust slice assignment(s). To institute slice assignments, in some examples fabric manager 114 may command one or more memory controllers 108 to program themselves to reassign memory addresses. Fabric manager 114 may receive a confirmation from a memory controller 108 that the requested slice assignment operation was successfully carried out, at which point the fabric manager may send a message to an OS indicating the slice assignment and potentially memory address range(s) associated with the assigned slice(s).

Memory controllers 108 may implement functionality that aids in management of disaggregated memory pool 106 for conditions where the memory pool experiences memory pressure—i.e., conditions in which an unassigned portion of the memory pool is relatively small. For example, a memory controller 108 may detect the presence of memory pressure (e.g., by analyzing the assignment of its attached memory 110), and in response issue requests to one or more compute nodes 102 to free assigned slice(s), free assigned slice(s) without consulting the compute nodes, issue warnings to compute nodes such that compute nodes may voluntarily free assigned slice(s), delay or disable requests for slice(s), and/or take any other suitable action. Further, memory controllers 108 may evaluate usage of attached memory 110 in identifying a slice to free, for example by identifying least recently used slices, least frequently used slices, or by considering any other suitable usage pattern.

The assignments of slices of disaggregated memory pool 106 may be enforced such that a compute node 102 cannot access a slice not assigned to that compute node. This per-node assignment may be enforced in any suitable manner. In some examples, each memory controller 108 may enforce per-node assignments—with knowledge of which compute node 102 is assigned to each slice of the memory 110 attached to that memory controller, the memory controller may block access to a slice, assigned to one compute node, by another compute node not assigned to that slice. Alternatively or additionally, per-node assignments may be enforced by providing to a compute node 102 only the address range(s) of slice(s) assigned to that compute node, and not address range(s) of slice(s) not assigned to that compute node.

Fabric manager 114 may be implemented in any suitable manner. As one example, fabric manager 114 may be implemented in code executing on one or more compute nodes 102 in computing system 100. In other examples, fabric manager 114 may be implemented by one or more compute nodes or any other suitable device external to computing system 100. Further, fabric manager 114 may have any suitable communicative relationship with components in computing system 100 to implement its functionality. For example, fabric manager 114 may communicate directly with compute nodes 102 to institute desired slice assignments, or in other examples may communicate with compute nodes via memory controllers 108 and/or native memory controllers 112. Where a switch (e.g., CXL switch) is used to facilitate communication between memory system 104 and compute nodes 102, fabric manager 114 may program the switch to facilitate memory system-node communication.

While FIG. 1 depicts the inclusion of fabric manager 114, implementations are possible in which the fabric manager is omitted. For example, fabric manager 114 may be omitted where computing system 100 includes a single compute node 102 connected to multiple memory controllers 108. In such examples, memory controllers 108 may receive requests to adjust slice assignment from the compute node 102, determine whether such requests can be fulfilled by attached memory 110, and, where an unassigned slice is not available to fulfill such requests, issue a request to the compute node to free slice(s). Generally, at least some of the functionality described herein in connection with memory controllers 108 alternatively or additionally may be implemented at fabric manager 114 (or any other suitable component(s)), and at least some of the functionality described herein in connection with the fabric manager alternatively or additionally may be implemented at the memory controllers (or any other suitable component(s)). In some examples, fabric manager 114 may be included in implementations in which computing system 100 includes two or more compute nodes 102 connected to a common memory controller 108. In other words, the inclusion of fabric manager 114 may be a function of whether computing system 100 includes multiple compute nodes 102.

It will be understood that freeing an assigned slice may involve any suitable operation(s). For example, a freed slice may be unassigned from the compute node 102 to which it was previously assigned, and subsequently assigned to a requesting compute node, such that the freed slice is then available for use in executing memory transactions (e.g., reads, writes, memory coherence operations). Data stored by the freed slice may be overwritten by the requesting compute node 102 once it is assigned to the freed slice. In other examples, data stored by the freed slice may be copied to another location before the slice is made available to the requesting compute node 102. For example, such data may be copied from disaggregated memory pool 106 to bulk memory (e.g., memory that is less performant than the memory in the memory pool).

Figure 3:
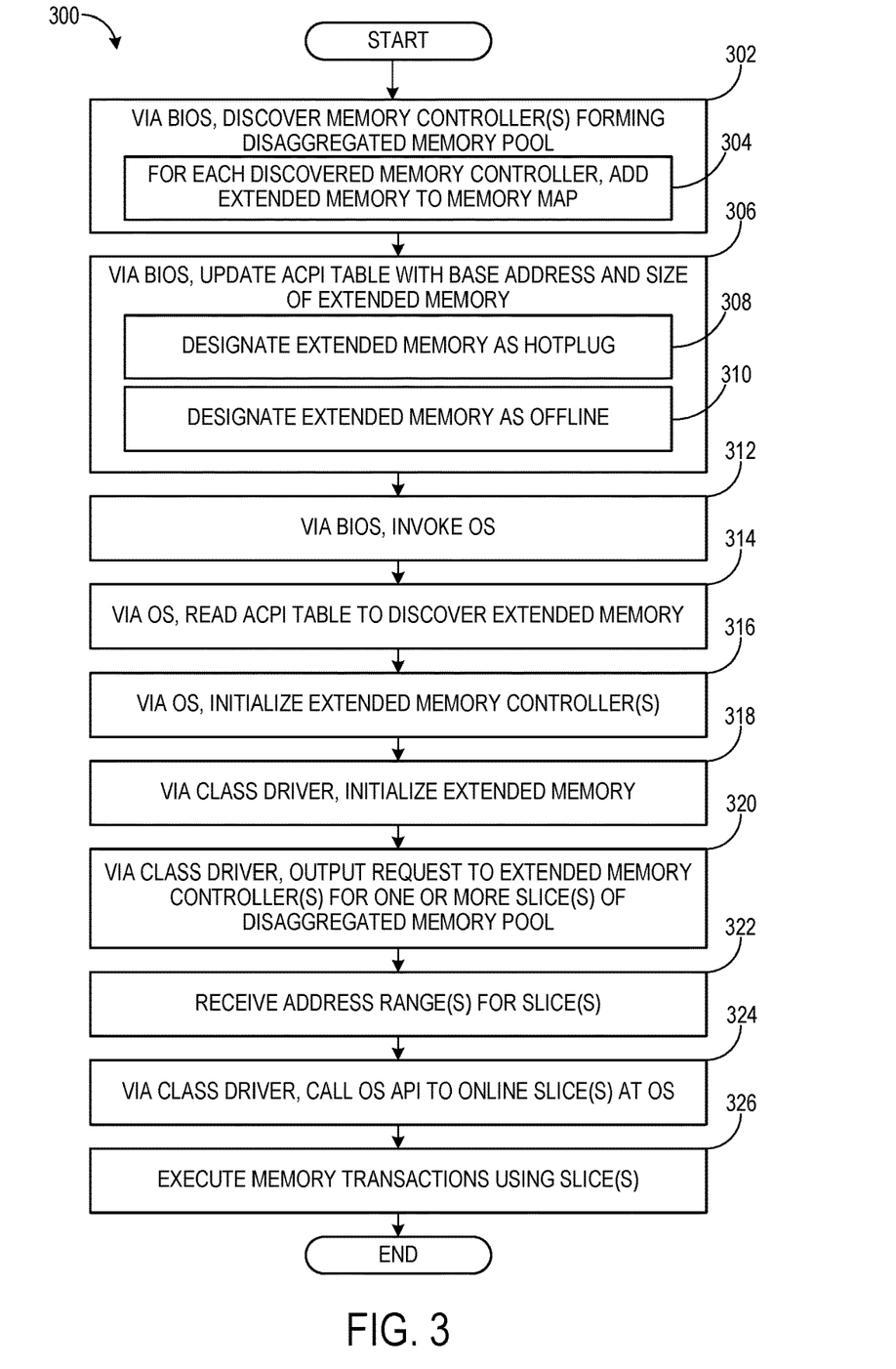
FIG. 3 shows a flowchart illustrating a method of onlining one or more slices of a disaggregated memory pool for use in executing memory transactions.

FIG. 3 shows a flowchart illustrating a method 300 of onlining at an OS one or more slices of a disaggregated memory pool for use in executing memory transactions. Method 300 may be implemented at a compute node 102 to online slice(s) of disaggregated memory pool 106, for example. Further, method 300 may be executed as part of the initialization (e.g., boot process) of a compute node.

Figure 4:
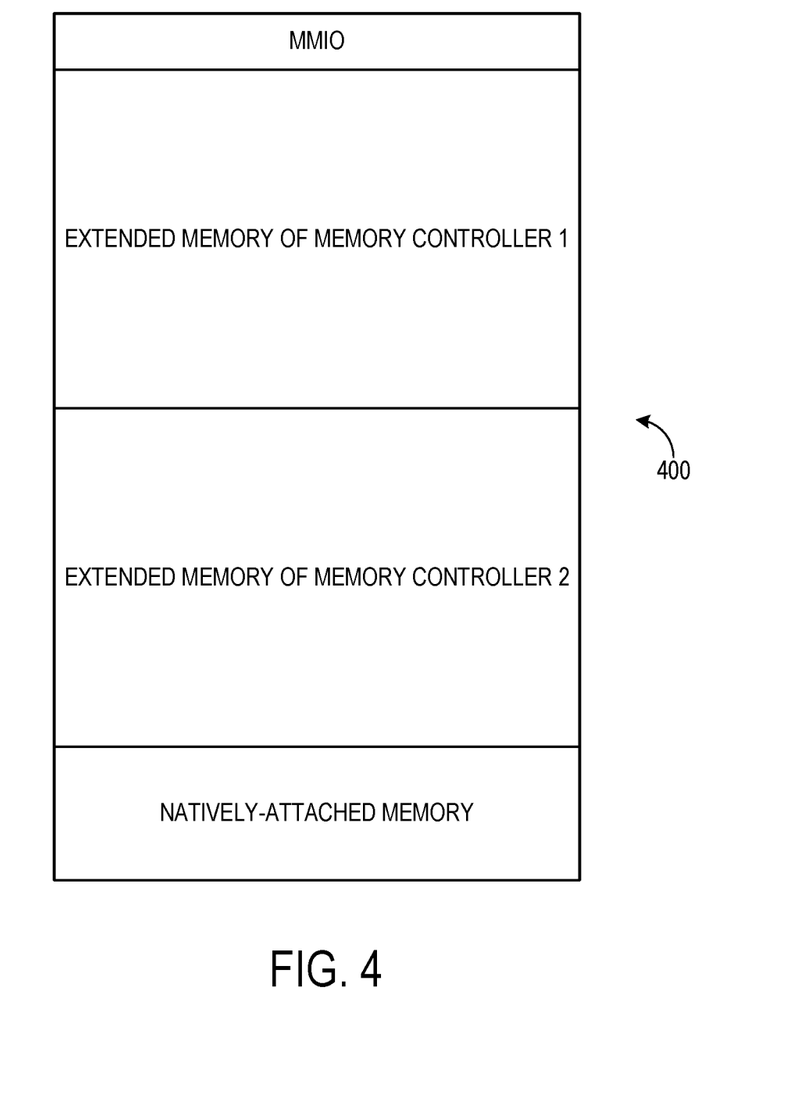
FIG. 4 illustrates an example physical address map.

At 300, method 300 includes, via a basic input/output system (BIOS) of a compute node, discovering one or more memory controllers having memory that forms the disaggregated memory pool. For example, compute node 102A may discover one or more of memory controllers 108A-108N, each of which is attached to respective memory 110 that collectively forms the memory of memory pool 106. In some examples, the compute node may employ CXL enumeration methods to discover the memory controller(s). Discovering the memory controller(s) may include adding 304, for each discovered memory controller, the extended memory attached to that memory controller to a physical address map of the compute node. FIG. 4 illustrates an example physical address map 400 in which the extended memory of two pooled memory controllers is mapped (e.g., extended memory 110A attached to pooled memory controller 108A and extended memory 110B attached to pooled memory controller 108B). Address map 400 also includes address information regarding memory-mapped input/output (MMIO) and memory (e.g., DDR) natively-attached to the compute node. In discovering the extent of each unit of extended memory attached to each pooled memory controller, the extent of the overall disaggregated memory pool may be discovered as well.

At 306, method 300 includes, via the BIOS, updating an ACPI table with a base address and size for the extended memory of each discovered memory controller. Updating the ACPI table may include designating 308 the extended memory as hotplug. Alternatively or additionally, updating the ACPI table may include designating 310 the extended memory as offline. Here, the extended memory is disabled at initialization of the compute node, where initialization refers to the part of node startup during which its BIOS is active and an OS is not launched. While an extent—e.g., memory address range—of the extended memory is visible and known to the compute node, it cannot yet be used as it is disabled by virtue of being designated as hotplug and/or offline. Likewise, the compute node is not yet aware of the slice(s) of the extended memory that the node may use, as address ranges of the slice(s) are not yet known. At this point, the extended memory and slice(s) thereof will not yet be used by the BIOS or startup code of an OS executed on the compute node.

At 312, method 300 includes, via the BIOS, invoking an OS. At 314, method 300 includes, via the OS, reading the ACPI table to discover the extended memory of each discovered memory controller. Here, and as described above, an extent of the extended memory may be visible and known to the OS, but the extended memory is not yet accessible as it may be disabled by virtue of being designated offline. At 316, method 300 includes, via the OS, initializing the discovered extended memory controllers. Initializing the discovered extended memory controllers may include enumerating the extended memory controllers.

At 318, method 300 includes, via a class driver implemented by the OS, initializing the extended memory of each discovered extended memory controller. At 320, method 300 includes, via the class driver, outputting a request to each discovered extended memory controller for one or more slice(s) of the disaggregated memory pool. At 322, method 300 includes receiving one or more address ranges for the slice(s). At 324, method 300 includes, via the class driver, calling an API of the OS to online the slice(s) at the OS. This may include designating the slice(s) as being online. Prior to designating the slice(s) as online, the slice(s) may be designating as offline. Here, the memory address(es) of the slice(s) are known by and accessible to the OS. At 326, method 300 includes executing memory transactions using the slice(s). This may include directing memory-related instructions (e.g., store, load) to the address range(s) associated with the slice(s). In view of the above, the boot or initialization process described above of a compute node may provide addressability of a disaggregated memory pool, while the onlining process described above may provide accessibility to the memory pool.

Figure 5:
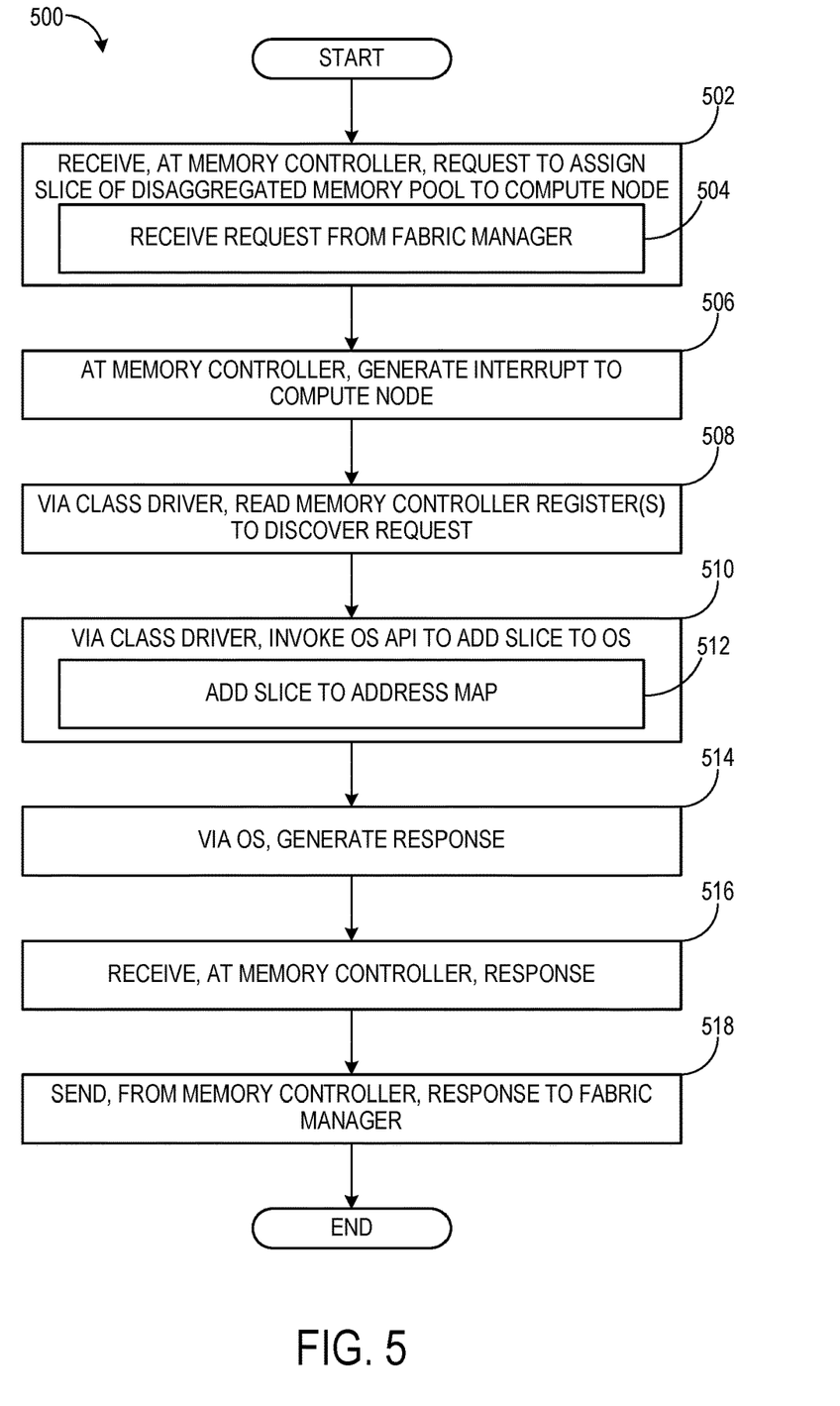
FIG. 5 shows a flowchart illustrating a method of assigning a slice of a disaggregated memory pool to a compute node.

FIG. 5 shows a flowchart illustrating a method 500 of assigning a slice of a disaggregated memory pool to a compute node. Method 500 may be implemented to assign slice(s) of disaggregated memory pool 106 to a compute node 102, for example.

At 502, method 500 includes receiving, at a pooled memory controller (e.g., memory controller 108A), a request to assign a slice of the disaggregated memory pool to the compute node. In some examples, the request may be received 504 from a fabric manager (e.g., fabric manager 114). The fabric manager may select the memory controller from a plurality of memory controllers, for example based on a manifest describing the assignments of slices of respective memory attached to each memory controller. In some examples, the request may be received by the fabric manager from another entity such as a higher-level allocator or hypervisor.

At 506, method 500 includes, at the memory controller, generating an interrupt to the compute node. The interrupt may be of the MSI-X, SIX, SMI, NMI forms, or any other suitable form. At 508, method 500 includes, via a class driver implemented by an OS executed on the compute node, reading one or more registers of the memory controller to discover the request to assign the slice to the compute node. This enables the OS to access the memory controller to discover the request regarding the slice. At 510, method 500 includes, via the class driver, invoking an API of the OS to add the slice to the OS. Adding the slice to the OS may include adding 512 the slice (e.g., a memory address range of the slice) to a physical address map maintained by the OS. In some examples, a native memory controller (e.g., native memory controller 112A) may store the address range of the slice, such that the native memory controller can direct instructions intended for the slice to the extended memory controller attached to the memory that includes the slice. With knowledge of the memory address information corresponding to the slice, the OS may execute memory transactions using the slice.

At 514, method 500 includes, via the OS, generating a response indicating that the assignment of the slice to the compute node is complete. At 516, method 500 includes receiving, at the memory controller, the response. The response may be sent via a CXL port of the memory controller associated with the compute node, as one example. At 518, method 500 includes sending, from the memory controller, the response to the fabric manager.

Figure 6:
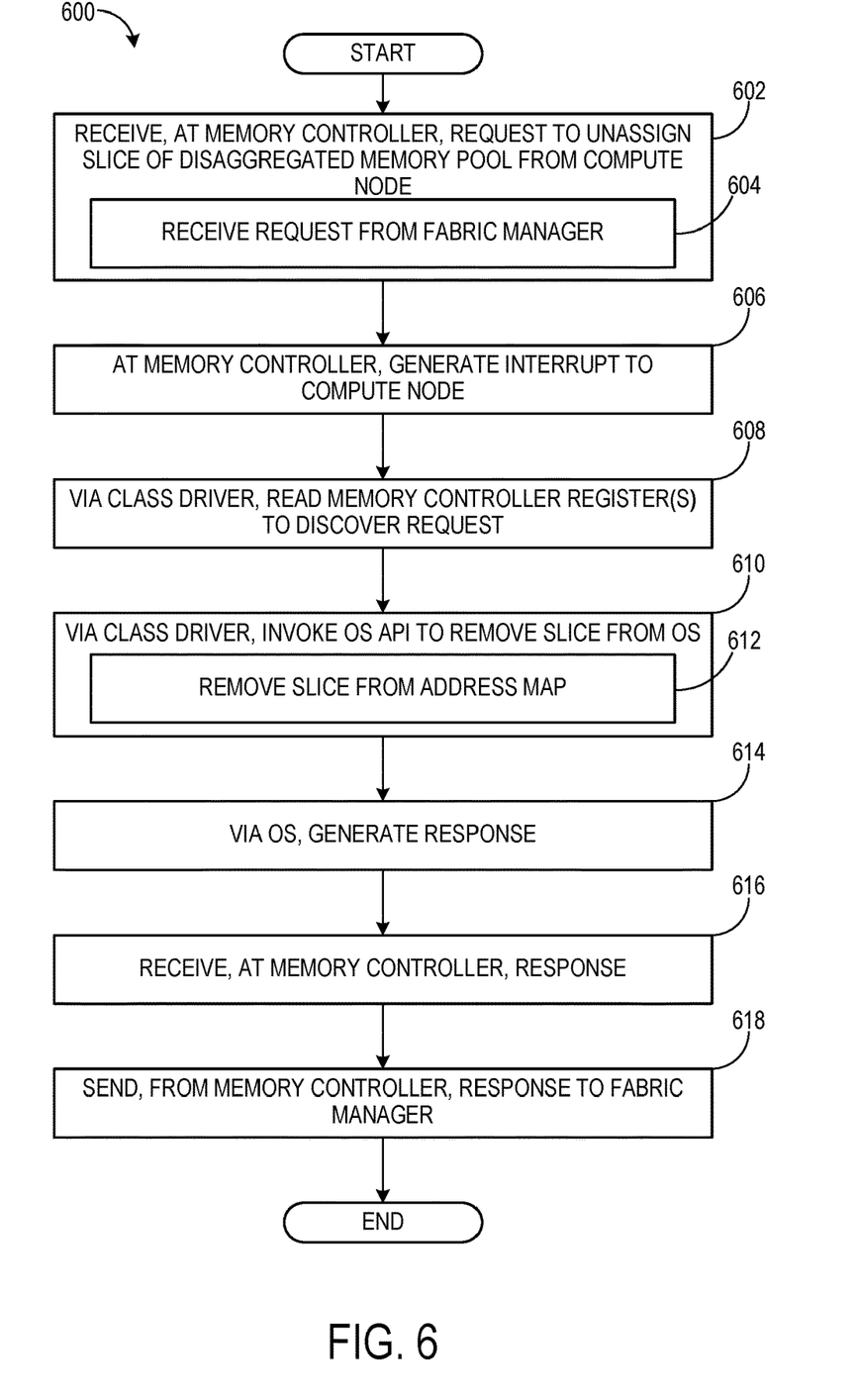
FIG. 6 shows a flowchart illustrating a method of unassigning a slice of a disaggregated memory pool assigned to a compute node.

FIG. 6 shows a flowchart illustrating a method 600 of unassigning a slice of a disaggregated memory pool assigned to a compute node. Method 600 may be implemented to unassign slice(s) of disaggregated memory pool 106, for example.

At 602, method 600 includes receiving, at a pooled memory controller (e.g., memory controller 108A), a request to unassign a slice of the disaggregated memory pool from a compute node. The request may be received 604 from a fabric manager, as one example. In some examples, the fabric manager may select the memory controller from a plurality of memory controllers to process the request. In other examples, another entity, such as a higher-level allocator, or a compute node, may identify the memory controller as the recipient of the request. Further, the compute node from which the slice is to be assigned may be identified in any suitable manner, such as by the fabric manager. In another example, the memory controller may analyze its slices to identify a slice whose un-assignment is likelier to be accepted—for example, the memory controller may prioritize slices for un-assignment according to a least recently used policy, or may determine that the data held in a slice is parked in another memory/storage location.

At 606, method 600 includes, at the memory controller, generating an interrupt to the compute node. At 608, method 600 includes, via a class driver implemented by an OS executed on the compute node, reading one or more register(s) of the memory controller to discover the request. At 610, method 600 includes, via the class driver, invoking an API of the OS to remove the slice from the OS. Removing the slice from the OS may include removing 612 the slice from a physical address map maintained by the OS. Prior to removing the slice, the OS may be queried to determine whether the slice can be freed—e.g., based on whether the OS or an application is using, or is likely to use in the future, the slice. If the OS accepts the request, the slice may be freed, and the OS may cease executing memory transactions using the slice. If the OS rejects the request, the slice will not be freed, however.

At 614, method 600 includes, via the OS, generating a response indicating whether the request is accepted or rejected. As described above, the OS may accept the request if the slice is not currently being used, is unlikely to be used in the future, includes low-priority data, and/or for any other suitable reason. The OS may reject the request if the slice is currently being used, is likely to be used in the future, includes high-priority or mission critical data, and/or for any other suitable reason. The response may be output to the memory controller. If the OS accepts the request, the response may indicate that the slice is freed. If the OS rejects the request, the response may indicate that the slice is not freed. At 616, method 600 includes receiving, at the memory controller, the response. At 618, method 600 includes sending, from the memory controller, the response to the fabric manager.

The approaches described herein enable the provision of a disaggregated memory pool that may be distributed among a plurality of compute nodes by way of flexibly and dynamically assigned slices. As described above, each compute node may be apprised of the extent of the memory pool, without initially being aware or able to access its constituent slices. Through a messaging-based framework, slices are onlined and made available to OSes executing on compute nodes, avoiding the complexities of hot-add procedures. Likewise, the messaging-based framework allows assigned slices to be un-assigned and provided to requesting compute nodes with consideration of the usage of the assigned slices, so that the computational workloads performed using assigned slices are not unduly interrupted, and without undergoing hot-remove procedures. These approaches thus may enhance thin provisioning implementations, but also apply to implementations that do not employ thin provisioning.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
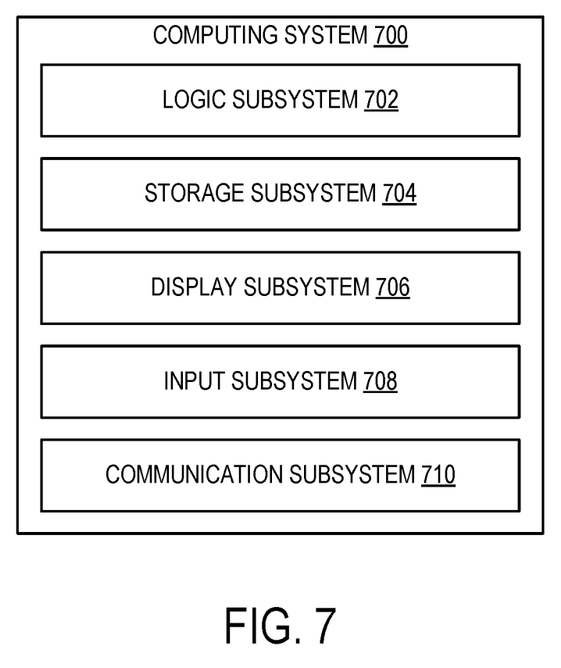
FIG. 7 shows a block diagram of an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic subsystem 702 and a storage subsystem 704. Computing system 700 may optionally include a display subsystem 706, input subsystem 708, communication subsystem 710, and/or other components not shown in FIG. 7.

Logic subsystem 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 704 includes one or more physical devices configured to hold instructions executable by the logic machine to implement the methods and processes described herein. When such methods and processes are implemented, the state of storage subsystem 704 may be transformed—e.g., to hold different data.

Storage subsystem 704 may include removable and/or built-in devices. Storage subsystem 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 704 may include volatile, nonvolatile, dynamic, static, read/write, read-only, random-access, sequential-access, location-addressable, file-addressable, and/or content-addressable devices.

It will be appreciated that storage subsystem 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 702 and storage subsystem 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic subsystem 702 executing instructions held by storage subsystem 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 706 may be used to present a visual representation of data held by storage subsystem 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic subsystem 702 and/or storage subsystem 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

Another example provides a memory system comprising a memory controller, and memory attached to the memory controller and forming at least a portion of a disaggregated memory pool, the disaggregated memory pool including a plurality of slices that are each dynamically assigned to a respective one of two or more compute nodes, where the memory system is configured to receive a request to adjust an assignment of the disaggregated memory pool to a requesting compute node, responsive to determining that the portion of the disaggregated memory pool includes an unassigned slice that can satisfy the request, assign at least part of the unassigned portion to the requesting compute node, and responsive to determining that the portion of the disaggregated memory pool does not include an unassigned slice that can satisfy the request, output a request to another compute node to free at least one slice of the plurality of slices assigned to such compute node. In such an example, an address range of the disaggregated memory pool may be visible to each of the two or more compute nodes. In such an example, the memory system alternatively or additionally may be configured to output a respective address range for each of the plurality of slices. In such an example, the request to free the at least one slice may be processed by an operating system executing on the other compute node. In such an example, the memory system alternatively or additionally may be configured to, responsive to the other compute node freeing at least one slice, output an address range of the at least one slice for reception by the requesting compute node, and responsive to the other compute node refusing to free the at least one slice, output an indication that the at least one slice is not freed. In such an example, for each of the two or more compute nodes, each of the plurality of slices may be disabled for such node at initialization. In such an example, the memory system alternatively or additionally may be configured to block access by the requesting compute node to a slice assigned to the other compute node. In such an example, the memory controller alternatively or additionally may be configured to describe an assignment of the portion of the disaggregated memory pool to a fabric manager, and to adjust the assignment of the portion of the disaggregated memory pool responsive to the fabric manager. In such an example, the memory controller alternatively or additionally may comprise one or more registers, and the memory controller alternatively or additionally may be configured to store an instruction to adjust an assignment of the portion of the disaggregated memory pool in the one or more registers, where the instruction may be discoverable by an operating system. In such an example, the memory may be mapped in a physical address space of each compute node. In such an example, the memory controller alternatively or additionally may be configured to, responsive to the other compute node rejecting the request to free the at least one slice, output to a fabric manager an indication that the request to free the at least one slice is rejected, and the fabric manager may be configured to issue a request to another memory controller to assign a slice of memory attached to the other memory controller to the requesting compute node.

Another example provides, at a compute node, a method, comprising discovering one or more memory controllers attached to respective memory that forms a disaggregated memory pool, the disaggregated memory pool including a plurality of slices that are each dynamically assigned to a respective one of two or more compute nodes, the plurality of slices initially disabled, outputting to at least one of the one or more memory controllers a request for one or more of the plurality of slices, receiving an address range of the one or more slices assigned to the compute node, and executing memory transactions using the one or more slices. In such an example, the method alternatively or additionally may comprise discovering an extent of the disaggregated memory pool. In such an example, the extent of the disaggregated memory pool may be discovered during initialization of the compute node. In such an example, the method alternatively or additionally may comprise initializing the disaggregated memory pool via a class driver implemented by the compute node. In such an example, the method alternatively or additionally may comprise adding the respective memory attached to each of the one or more memory controllers to a memory map. In such an example, the request may be output via a class driver implemented by the compute node. In such an example, the method alternatively or additionally may comprise designating the one or more slices as online.

Another example provides, at a compute node, a method, comprising accessing a memory controller to discover a request regarding a slice of a disaggregated memory pool, where the request is to assign the slice to the compute node, add an address range of the slice to a memory map and execute memory transactions using the slice, and where the request is to free the slice from the compute node, query an operating system executed by the compute node to determine whether the slice can be freed. In such an example, the method alternatively or additionally may comprise, responsive to the operating system accepting the request, output a response to the memory controller indicating that the slice is freed and cease executing memory transactions using the slice, and responsive to the operating system rejecting the request, output a response to the memory controller indicating that the slice is not freed.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A memory system, comprising:
two or more compute nodes configured to output memory assignment requests;
a memory controller; and
memory attached to the memory controller and forming at least a portion of a disaggregated memory pool, the disaggregated memory pool including a plurality of slices that are each dynamically assigned to a respective one of the two or more compute nodes,
where the memory system is configured to:
receive a request to adjust an assignment of the disaggregated memory pool to a requesting compute node of the two or more compute nodes;
responsive to determining that the portion of the disaggregated memory pool does not include an unassigned slice that can satisfy the request, output a request to another compute node of the two or more compute nodes to free at least one slice of the plurality of slices assigned to such compute node;
responsive to the other compute node rejecting the request to free the at least one slice, output to a fabric manager an indication that the request to free the at least one slice is rejected, where the fabric manager is configured to receive descriptions of memory slices attached to each memory controller and assemble a memory manifest for the disaggregated memory pool based on the descriptions of the memory slices, and where the fabric manager is configured to issue a request to another memory controller to assign a slice of memory attached to the other memory controller to the requesting compute node;
transmit, to the requesting compute node, an address range of the slice assigned to the requesting compute node; and
where the requesting compute node is configured to:
receive the address range of the slice assigned to the requesting compute node; and
execute memory transactions using the slice.

2. The memory system of claim 1, where an address range of the disaggregated memory pool is visible to each of the two or more compute nodes.

3. The memory system of claim 1, where the memory system is further configured to output a respective address range for each of the plurality of slices.

4. The memory system of claim 1, where the request to free the at least one slice is processed by an operating system executing on the other compute node.

5. The memory system of claim 1, where for each of the two or more compute nodes, each of the plurality of slices is disabled for such node at initialization.

6. The memory system of claim 1, where the memory system is further configured to block access by the requesting compute node to a slice assigned to the other compute node.

7. The memory system of claim 1, where the memory controller is further configured to describe an assignment of the portion of the disaggregated memory pool to the fabric manager, and to adjust the assignment of the portion of the disaggregated memory pool responsive to the fabric manager.

8. The memory system of claim 1, further comprising one or more registers, the memory controller configured to store an instruction to adjust an assignment of the portion of the disaggregated memory pool in the one or more registers, where the instruction is discoverable by an operating system.

9. The memory system of claim 1, where the memory is mapped in a physical address space of each compute node.

10. At a compute node, a method, comprising:
discovering a memory controller of two or more memory controllers attached to respective memory that forms a disaggregated memory pool, the disaggregated memory pool including a plurality of slices that are each dynamically assigned to a respective one of two or more compute nodes, the plurality of slices initially disabled;
outputting a request for a slice of the plurality of slices to the memory controller, where responsive to the memory controller rejecting the request for the slice, the memory controller outputs to a fabric manager an indication that the request for the slice is rejected, where the fabric manager is configured to receive descriptions of memory slices attached to each memory controller of the two or more memory controllers and assemble a memory manifest for the disaggregated memory pool based on the descriptions of the memory slices, and where the fabric manager is configured to issue a request to a second memory controller of the two or more memory controllers to assign a slice of memory attached to the second memory controller to the compute node;
receiving an address range of the slice assigned to the compute node; and
executing memory transactions using the slice.

11. The method of claim 10, further comprising discovering an extent of the disaggregated memory pool.

12. The method of claim 11, wherein the extent of the disaggregated memory pool is discovered during initialization of the compute node.

13. The method of claim 10, further comprising initializing the disaggregated memory pool via a class driver implemented by the compute node.

14. The method of claim 10, further comprising adding the respective memory attached to each of the two or more memory controllers to a memory map.

15. The method of claim 10, wherein the request is output via a class driver implemented by the compute node.

16. The method of claim 10, further comprising designating the slice as online.

17. At a compute node, a method, comprising:
outputting, to a memory controller, a request to assign a slice of a disaggregated memory pool to the compute node;

where the request is rejected by the memory controller, the memory controller outputs to a fabric manager an indication that the request for the slice is rejected, where the fabric manager is configured to receive descriptions of memory slices attached to each memory controller of two or more memory controllers and assemble a memory manifest for the disaggregated memory pool based on the descriptions of the memory slices, and where the fabric manager is configured to issue a request to a second memory controller of the two or more memory controllers to assign a slice of memory attached to the second memory controller to the compute node; and adding an address range of the slice to a memory map and execute memory transactions using the slice.

\* \* \* \* \*